United States Patent [19]

Eto et al.

[11] 4,107,589
[45] Aug. 15, 1978

[54] AUTOMATIC TOOL CHANGE APPARATUS

[75] Inventors: Kunihiko Eto, Toyota; Kuniyuki Niwa, Kariya; Kaoru Owa, Nukata, all of Japan

[73] Assignee: Toyoda-Koki Kabushiki-Kaisha, Japan

[21] Appl. No.: 817,023

[22] Filed: Jul. 19, 1977

[30] Foreign Application Priority Data

Jul. 28, 1976 [JP] Japan .................................. 51-90666

[51] Int. Cl.² ............................................ G05B 19/28
[52] U.S. Cl. ...................................... 318/602; 29/568
[58] Field of Search ............... 29/568, 26 A; 318/602, 318/565

[56] References Cited

U.S. PATENT DOCUMENTS 3,689,820  9/1972  Takegawa ........................ 318/602 X
3,744,124  7/1973  Gardiner ............................... 29/568

Primary Examiner—Gil Weidenfeld
Attorney, Agent, or Firm—Oblon, Fisher, Spivak, McClelland & Maier

[57] ABSTRACT

In an automatic tool change apparatus, numbers of tools stored in respective tool holding devices mounted on a magazine and held in a spindle are identifiable whether the tools are large or small ones. A combination of a tool held in the spindle and a tool commanded by NC data is discriminated to selectively perform a normal or special cycle of a tool change operation.

5 Claims, 11 Drawing Figures

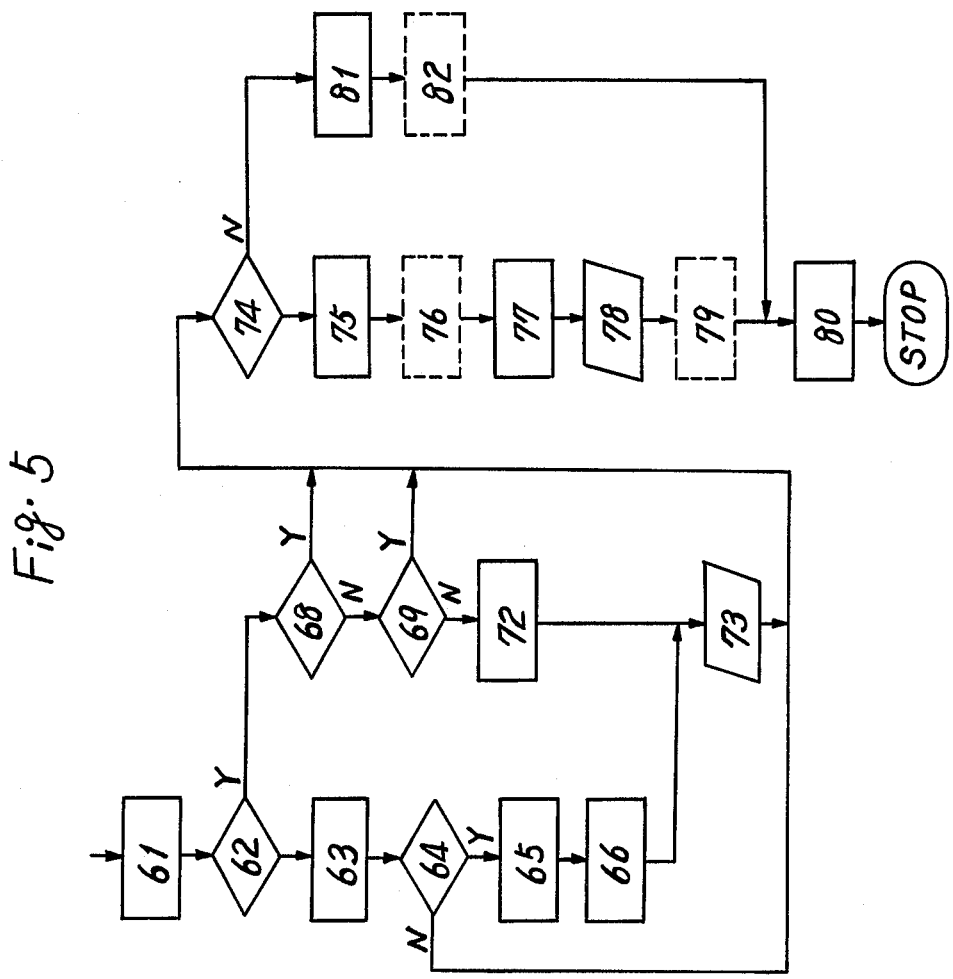

AUTOMATIC TOOL CHANGE APPARATUS

BACKGROUND OF THE INVENTION

1. Field of the Invention

The present invention relates to an automatic tool change apparatus wherein numbers of tool holding devices stored in a magazine and numbers of tools held in the respective tool holding devices are correspondingly stored in a memory device, a tool commanded by numerical control data (NC data) is searched with its number in the memory device and indexed at a tool change position, a tool transfer device performs a tool change operation to move the commanded tool into the spindle and return the tool held in the spindle into an empty tool holding device, and the content of the memory device is rewritten at every tool change operation.

2. Description of the Prior Art

In a conventional automatic tool change apparatus capable of a random tool selection, the used tool is returned to a tool holding device holding a tool to be next used. Accordingly, if large and small tools are mixedly used, it may sometimes happen that the used tool cannot be returned. For example, assuming that a tool commanded by NC data is a small one and the used tool is a large one, the used tool cannot be returned, since if the used tool is returned to a tool holding device holding the small tool, the used tool interferes with tools held in adjacent tool holding devices.

For this reason, it has been the practice that the used tool is again returned to the tool holding device which held the same before its use, if large and small tools are mixedly used. However, in this system, two indexing operations are necessary at every tool change operation to index a tool holding device holding a tool commanded by NC data and to index a tool holding device into which the used tool is to be returned, which results in a longer tool change time.

SUMMARY OF THE INVENTION

It is an object of the present invention to provide a new and improved automatic tool change apparatus capable of returning the used tool in a random manner even if large and small tools are mixedly used.

Another object of the present invention is to provide a new and improved automatic tool change apparatus capable of performing a tool change operation in a short time, even if large and small tools are mixedly used.

Briefly, according to the present invention, these and other objects are achieved by providing an automatic tool change apparatus for a machine tool, as mentioned below. A plurality of tool holding devices are provided on a magazine and store a variety of tools and are addressed in a numerical order. A tool transfer device performs a tool change operation between a tool indexed at a predetermined tool change position on the magazine and a tool held in a spindle of the machine tool. Means is provided to rotate the rotatable magazine. Means is provided to generate an index signal each time each tool holding device is indexed to the tool change position. Command means commands a tool to be indexed to the tool change position. First memory means stores a number of a tool held in the spindle. Second memory means stores a relationship between numbers of the tool holding devices and numbers of the tools held in the respective tool holding devices. Third memory means is responsive to the command means to store a number of the commanded tool. Fourth memory means is responsive to the index signal generating means to store a number of a tool holding device indexed at the tool change position. Means is responsive to the command means for searching for a number of a tool holding device holding the commanded tool from the second memory means. Fifth memory means is responsive to the searching means to store the searched number of the tool holding device. Means is provided to determine a rotational direction of the magazine in accordance with a difference in the contents stored in the fourth and fifth memory means to thereby cause the rotating means to rotate the magazine and to check coincidence of the contents in the fourth and fifth memory means. Means is provided to load the content of the third memory means into the first memory means and to load the content of the first memory means into the second memory means after the tool change operation has been completed by the tool transfer device.

The automatic tool change apparatus further comprises the numbers of the tools being identifiable whether the tools are large or small ones. First discrimination means discriminates whether the tool held in the spindle and the commanded tool are large or small ones in accordance with the contents stored in the first and third memory means. Second discrimination means is responsive to the first discrimination means to discriminate a combination of the tool held in the spindle and the commanded tool so as to determine whether the tool held in the spindle can be immediately returned to the tool holding device holding the commanded tool. Cycle control means is responsive to the second discriminating means to cause a normal cycle of a tool change operation to be performed if the spindle tool has been found to be immediately returnable, and to cause a special cycle of a tool change operation to be performed if the spindle tool has been found not to be immediately returnable.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 5 is a flow chart of another tool change operation.

DETAILED DESCRIPTION OF THE PREFERRED EMBODIMENT

Figure 1:
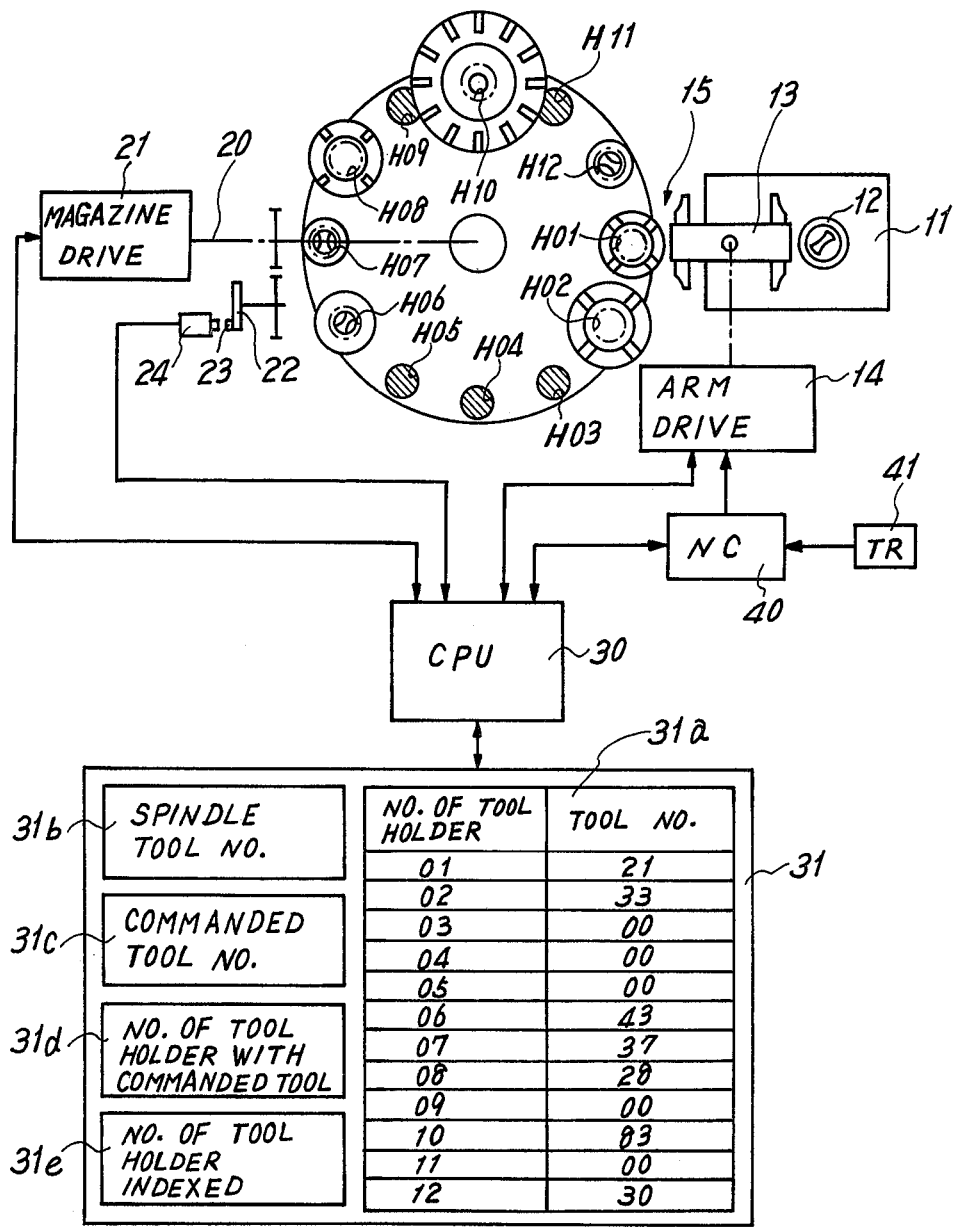
FIG. 1 is a schematic block diagram of a tool change apparatus according to the present invention.

Referring now to the drawings, wherein like reference numerals or characters refer to identical or corresponding parts throughout the several views, and more particularly to FIG. 1, there is shown a magazine 10 which is rotatably mounted on a body of a machine tool, not shown. A plurality of tool holding devices H01 to H12 are equidistantly arranged on the periphery of a magazine 10 and hold a plurality of small tools having a diameter smaller than a pitch of two adjacent tool holding devices and a large tool having a diameter larger than the pitch.

A spindle head 11 is provided to rotatably support a spindle 12 and has mounted thereon a tool transfer device or tool change arm 13 (hereinafter referred to as arm) for exchanging a tool held in the spindle 12 for a tool indexed at a tool change position 15 on the magazine 10 by means of an arm drive device 14. When a tool change command is applied from a numerical control device 40 (NC device), as will be described later, the automatic tool change apparatus performs a tool change operation either at a normal or special cycle. At the normal cycle, a tool commanded by NC data is indexed at the tool change position 15. The arm 13 operates to grip the tool held in the spindle 12 and the commanded tool indexed at the tool change position 15, to advance forwardly, to rotate 180 degrees, to retract rearwardly and to unclamp the now exchanged tools. At the special cycle, wherein a temporary stop command is applied to the arm drive device 14 from a computer 30, which will be described later, a tool commanded by NC data is indexed at the tool change position 15. The arm 13 operates to grip the tool held in the spindle 12 and the commanded tool indexed at the tool change position 15, to advance forwardly, and to rotate 90° to be stopped in position temporarily. A tool holding device capable of receiving the tool held in the spindle 12 is then indexed at the tool change position 15. Subsequently, the temporary stop command disappears so that the arm 13 rotates the remaining 90°, retracts rearwardly and unclamps the now exchanged tools.

A rotary shaft 20 of the magazine 10 is connected to a magazine driving device 21 to index the magazine 10 in response to a command given from the computer 30. An index plate 22 is connected to the rotary shaft 20 through gears in such a manner as to be rotated one revolution when the magazine 10 is rotated one pitch. A projection 23 is provided on the index plate 22 to actute a corresponding proximity switch 24 to apply an index signal to the computer 30, each time the magazine 10 is rotated one pitch, tht is, each tool holding device is indexed to the tool change position 15.

The NC device 40 applies machining data to the machine tool, not shown, data for a required tool to the computer 30 and a tool change command to the arm drive device 14 in response to NC data read out by a tape reader 41.

A memory device 31 comprises an area 31a for storing a table of a relationship between the number of the tool holding device and the number of a tool held in the respective tool holding device, an area 31b for storing the number of a tool received in the spindle 12, an area 31c for storing the number of a required tool commanded by NC data, an area 31d for storing the number of a tool holding device which holds the required tool, and an area 31e responsive to the index signal from the proximity switch 24 for storing the number of a tool holding device which is indexed at the tool change position 15. The table stored in the area 31a is prepared by a manual setting device, not shown, prior to the operation of the machine. In order to distinguish large and small tools, the number less than 80 is used for a small tool and the number equal to or larger than 80 is used for a large tool. The number 0 is used as a tool number for a tool holding device which holds no tool therein. The content of the memory device 31 is rewritten by the computer 30, each time a tool change operation has been performed.

The computer 30 is of a small capacity, such as a microcomputer, capable of collectively controlling a tool change operation. When applied with data for a required tool from the NC device 40, the computer 30 discriminates whether a tool commanded by the data for the required tool and a tool held in the spindle are large or small ones, determines whether the used tool in the spindle can be returned immediately, causes to perform a normal cycle of tool change operation if the used tool can be returned immediately, and causes to perform a special cycle of tool change operation if the used tool cannot be returned immediately.

Prior to the description of the operation of the computer 30, it is described that in what case the used tool cannot be returned immediately. Combinations of a required tool designated by NC data and a tool held in the spindle become as shown in Table 1, taking it into consideration that no tool is held either in a tool holding device or in the spindle.

TABLE 1

| Required Tool | S | S | S | L | L | E | E | E |
|---|---|---|---|---|---|---|---|---|
| Used Tool | E | S | L | E | S | L | E | S | L |
| Possiblity of Immediate Tool Change | O | O | X | O | X | O | O | O | X |

Figure 2C:
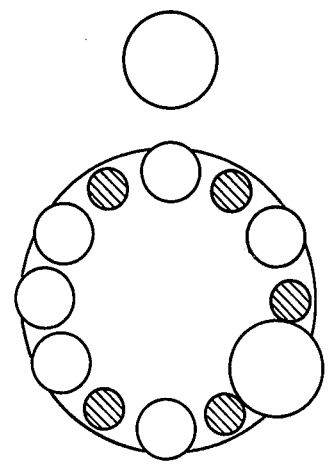
FIGS. 2A to 2F show combinations of large and small tools for tool change operation.
Figure 2F:
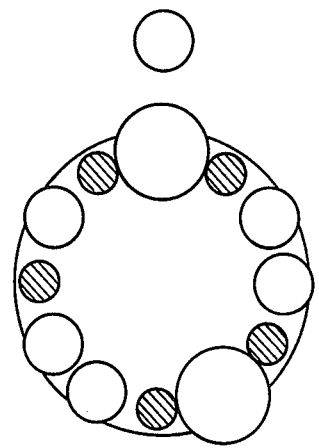
Figure 2B:
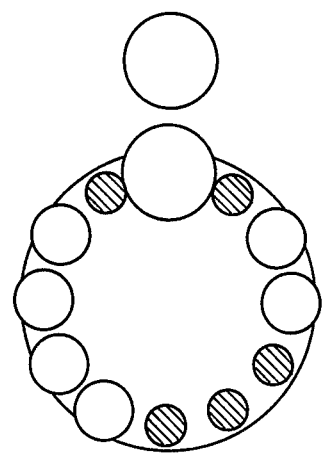
Figure 2E:
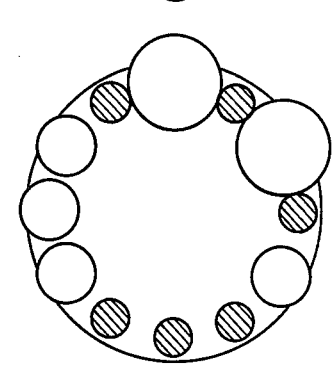
Figure 2A:
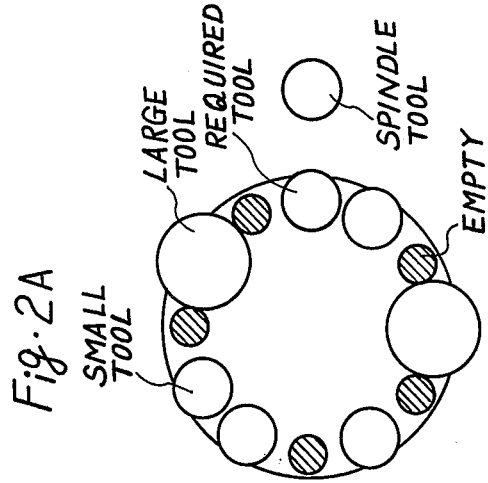
Figure 2D:
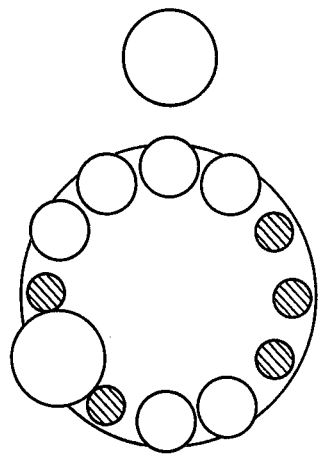

In TABLE 1, the marks L, S, and E show a large tool, a small tool and an empty tool, respectively. The combination marked by O shows the case where a tool change operation can be immediately performed, while the combination marked by X shows the case where a tool change operation cannot be immediately performed. However, even in the combination marked by X, a tool change operation may be performed immediately, if a required tool is a small one and a used tool is a large one and two tool holding device, sandwiching the tool holding device holding the required tool, are empty. All combinations are shown in FIGS. 2A to 2F, excluding a combination wherein at least one of the spindle and a tool holding device for a required tool is empty, for the reason that it is rare that one of them is empty in a normal tool change operation. FIGS. 2A and 2B show the combinations between small and small tools, and between large and large tools, respectively, which permit an immediate tool change operation. FIGS. 2C and 2D show the combinations wherein a required tool is a small one and a spindle tool is a large one. In the case of FIG. 2C, two tool holding devices sandwiching a tool holding device for a required tool are empty, whereby a tool change operation can be immediately performed. On the other hand, in the case of FIG. 2D, an immediate tool change operation is impossible. FIGS. 2E and 2F show the combinations wherein a required tool is a large one and a spindle tool is a small one. In the case of FIG. 2E, a tool change operation can be immediately performed. On the other hand, in the case of FIG. 2F, there is no room to return a large tool in the next tool change operation, if an immediate tool change operation is performed. Accordingly, an immediate tool change operation cannot be performed.

Figure 3:
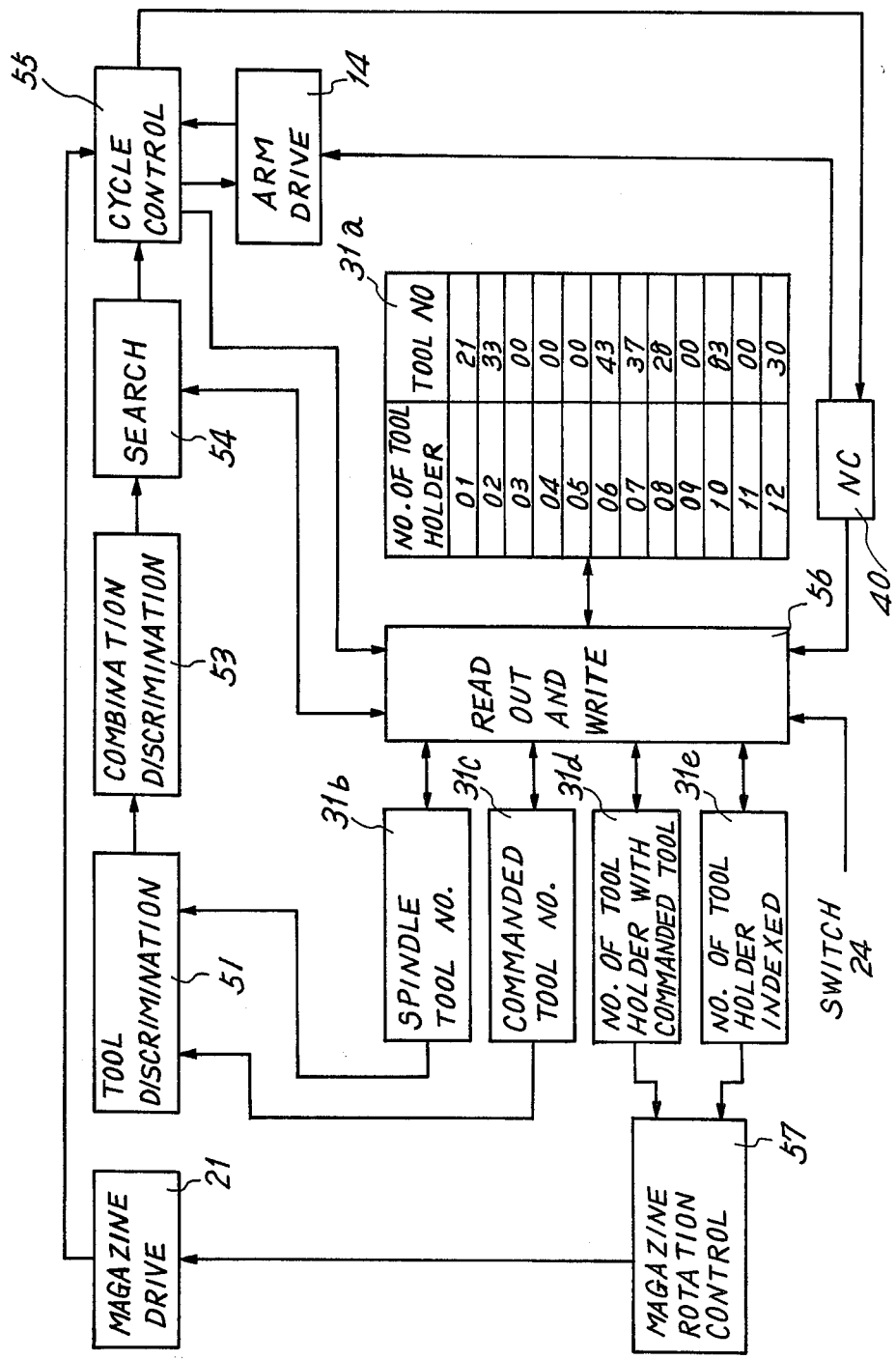
FIG. 3 is a block diagram for describing an operation of a computer shown in FIG. 1.

FIG. 3 shows a block diagram for describing the operation of the computer 30. The computer 30 operates as a tool discrimination circuit 51, combination discrimination circuit 53, a search circuit 54, a cycle control circuit 55, a magazine rotation control circuit 57 and a reading-out and writing circuit 56. The reading-out and writing circuit 56 reads out and writes the contents of the respective areas 31a, 31b, 31c, 31d and 31e of the memory device 31. More specifically, the reading-out and writing circuit 56 writes data for a required tool number in the area 31c upon receipt of the same from the NC device 40, and writes the number of a tool holding device holding the required tool in the area 31d after searching or scanning the same in the area 31a. When a tool change operation has been completed, the reading-out and writing circuit 56 writes the tool number stored in the area 31b into a tool number column in the area 31a corresponding to the number of the tool holding device stored in the area 31d and writes the tool number stored in the area 31c into the area 31b and reads out and writes the contents of the respective areas in response to a command given from the search circuit 54, which will be described later. The magazine rotation control circuit 57 controls the rotational direction and the amount of rotation of the tool storage magazine 10. The magazine rotation control circuit 57 detects the difference in the numbers of the tool holding devices stored in the areas 31d and 31e and causes the magazine driving device 21 to rotate the magazine in either direction in accordance with the detected difference, in order to increase the speed of indexing of the tool holding device holding the required tool into the tool change position 15. The magazine rotation control circuit 57 also checks whether the content in the area 31e coincides with the content in the area 31d. A number of a tool holding device stored in the area 31e is rewritten each time the magazine is rotated one pitch. The tool discrimination circuit 51 discriminates whether a tool in the spindle 12 and a required tool are large or small in accordance with the tool numbers stored in the area 31b and 31c. The circuit 51 discriminates a tool as small if the tool number thereof is less than 80, as large if the tool number thereof is equal to or larger than 80, and as empty if the tool number thereof is zero. The combination discrimination circuit 53 discriminates a combination between a tool held in the spindle 12 and a required tool in response to an output signal from the tool discrimination circuit 51. The search circuit 54 effects discrimination in the case where only a combination detected by the combination discrimination circuit 53 does not permit the discrimination of normal or special cycle, and searches whether there are three consecutive tool holding devices with no tools in the area 31a or whether two tool holding devices sandwiching a required tool are empty. The cycle control circuit 55 controls a normal or special cycle of a tool change operation in response to an output signal from the search circuit 54.

Figure 4A:
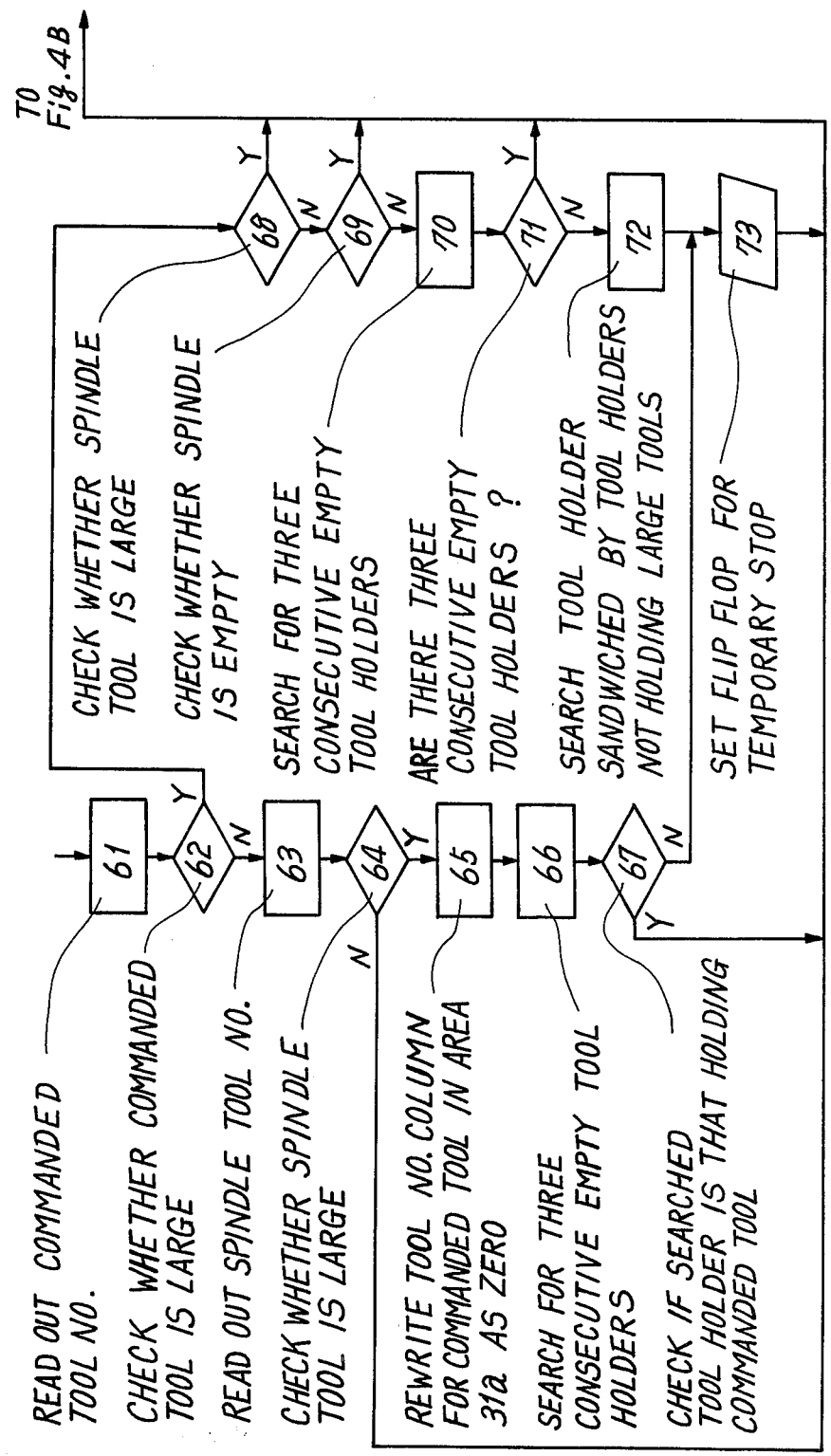
FIGS. 4A and 4B are flow charts of a tool change operation.
Figure 4B:
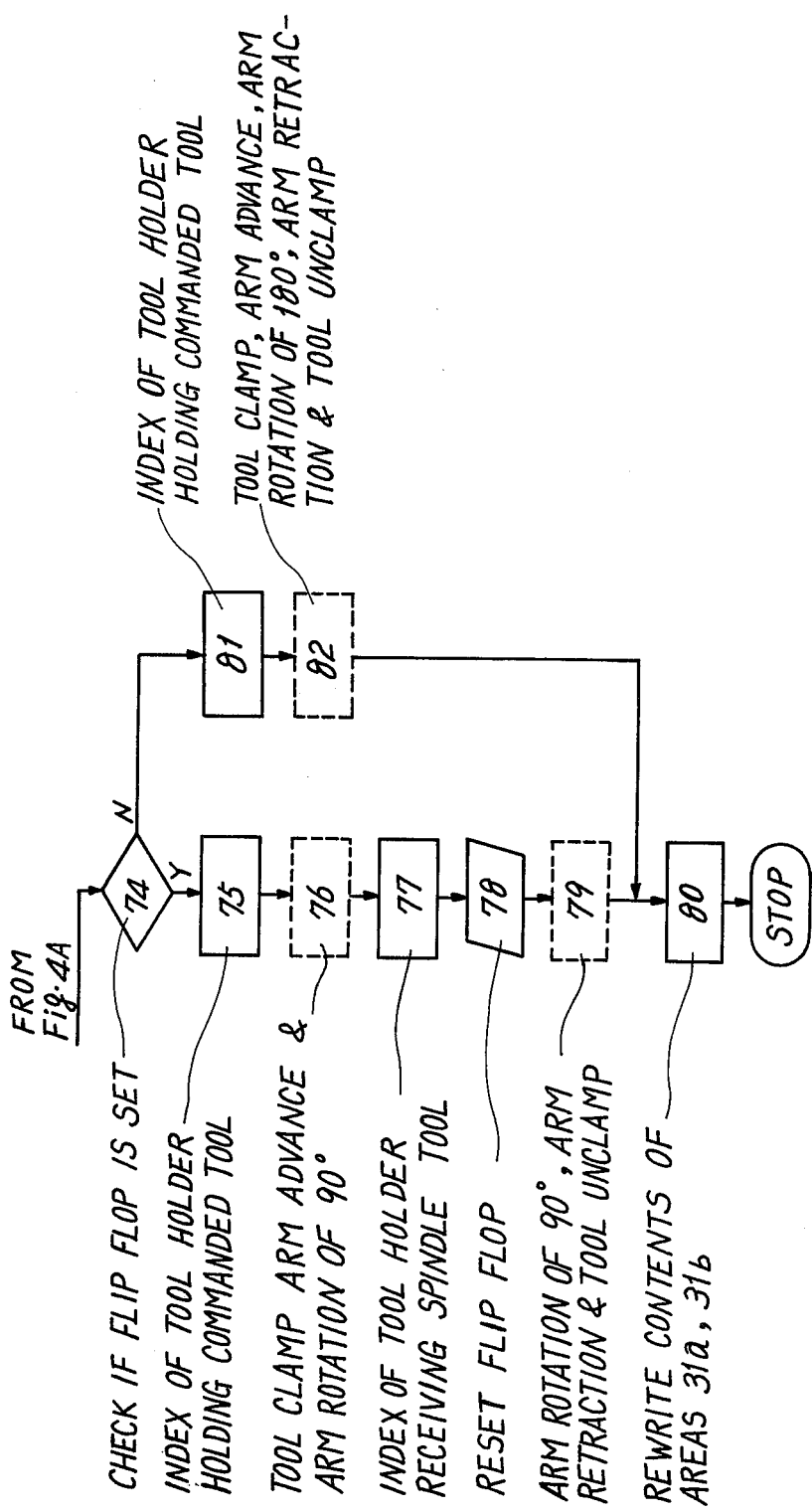

The operation of the automatic tool change apparatus as constructed hereinabove will be described for each of the combinations shown in FIGS. 2A to 2F, with reference to the flow chart shown in FIG. 4.

COMBINATION OF FIG. 2A

When the NC control device 40 generates data for a required small tool, the number of this required tool is read out and written by the reading-out and writing circuit 56 into the area 31c and the number of a tool holding device holding the required tool is searched in the area 31a and then written into the area 31d. The number of the required tool written into the area 31c is read out in step 61. In step 62, it is discriminated by the tool discrimination circuit 51 whether the required tool is a large one. Since the required tool is a small one in this case, the process goes to step 63, wherein the number of the spindle tool stored in the area 31b is read out.

In step 64, it is discriminated whether the spindle tool is a large one. Since the spindle tool is also a small one in this case, the process jumps to a step 74, wherein it is examined whether a flip flop, not shown, for a temporary stop is set or not to select either a normal or special cycle. In this case, a step 73 for setting the flip flop for temporary stop is not passed through so that the flip flop for temporary stop is not set. Accordingly, the process goes to a step 81 for a normal cycle. In step 81, the magazine rotation control circuit 57 generates a signal to the magazine driving device 21 to index the required tool to the tool change position 15. When the indexing is completed, the magazine driving device 21 generates an indexing completion signal to the cycle control circuit 55. This signal is fed back to the NC device as a cycle completion signal. Accordingly, the NC device discriminates the completion of the indexing and reads out tool change command data from the tape reader 41 to apply the tool change command to the arm drive device 14. With the tool change command being applied to the arm drive circuit 14, the arm 13 simultaneously clamps the required tool indexed at the tool change position 15 and the tool held in the spindle 12 and advances forwardly. Subsequently, the arm 13 rotates 180° and retracts rearwardly and then unclamps the now exchanged tools to complete the tool change operation in the normal cycle. When the tool change operation is completed, the cycle control circuit 55 applies a command to the reading-out and writing circuit 56 to cause the tool number in the area 31b to be written into the tool number column which had stored the required tool number in the area 31a and to cause the required tool number to be written into the area 31b.

COMBINATION OF FIG. 2B

In this case, it is discriminated in step 62 that a required tool is a large one, and the process goes to step 68, wherein it is discriminated whether a spindle tool is a large one. Since the spindle tool is also a large one in this case, the process jumps to step 74, wherein it is examined in the same manner in the previous case whether the flip flop for a temporary stop is set or not. In this case also, the step 73 is not passed through so that the flip flop for temporary stop is not set. Accordingly similar to the previous case, the process goes to the step 81 for the normal tool change cycle.

COMBINATION OF FIG. 2C

In this case, it is discriminated in step 62 that a required tool is a small one and in step 64 that a spindle tool is a large one. Thereafter, the process goes to a step 65 wherein the tool number column corresponding to the required tool in area 31a is rewritten as zero for the preparation of a next step 66. In consequence, the area 31a represents the status of the magazine 10 after the required tool has been removed. In step 66, an empty tool holding device sandwiched by empty tool holding devices is searched in the table of the area 31a, the search being started from the tool holding device holding the required tool. In this case, the tool holding devices sandwiching the tool holding device holding the required tool are empty, and thus this tool holding device is searched. When the searched tool holding device is identified as that holding the required tool in step 67, the process goes to the step 74 to carry out the normal cycle in a similar manner to the previous two cases.

COMBINATION OF FIG. 2D

If tool holding devices sandwiching a tool holding device holding a required tool are not empty, the process goes to step 73, wherein the flip flop for temporary stop is set. In consequence, the special cycle is selected in step 74 and then the process goes to step 75, wherein the required tool is indexed at the tool change position 15, similar to the step 81 in the normal cycle. When the required tool is indexed, the process goes to step 76, wherein the NC device is caused to apply a tool change command to the arm driving device 14. However, since in this case the flip flop for temporary stop is set to apply a temporary stop command to the arm driving device 14, the arm 13 clamps the tools and advances forwardly and rotates only 90° for temporary stop. When the arm is temporarily stopped, an arm stop signal is applied from the arm driving circuit 14 to the cycle control circuit 55. As a result, the process goes from step 76 to step 77. In step 77, the number of the empty tool holding device sandwiched by the empty tool holding devices, which has been searched in step 66, is loaded in the area 31d, and the searched tool holding device is indexed at the tool change position 15. When an index completion signal is generated from the magazine driving circuit 21 after the completion of the index operation, the flip flop for temporary stop is reset. As a result, the temporary stop command applied to the arm driving circuit 14 disappears so that the arm 13 rotates the remaining 90° and retracts rearwardly and unclamps the tools to complete the tool change operation in the special cycle.

COMBINATION OF FIG. 2E

This combination is discriminated in steps 62 and 68, and then the process goes to step 69 wherein it is examined whether the spindle 12 is empty or not. If the spindle is empty, the normal cycle can be unconditionally performed and therefore the process jumps to step 74. However, since the spindle is not empty in this case, the process goes to step 70, wherein an empty tool holding device sandwiched by empty tool holding devices is searched. Since in this case the tool number column corresponding to the required tool in the table is not rewritten as zero, tool holding devices other than that holding the required tool are searched. In step 71, it is examined whether there is an empty tool holding device sandwiched by empty tool holding devices. If there is an empty tool holding device, the normal cycle is performed through the step 74.

COMBINATION OF FIG. 2F

In this case, the special cycle is discriminated in step 71 and the process goes to step 72, wherein an empty tool holding device sandwiched by tool holding devices, which do not hold large tools, is searched for the preparation of step 77. The flip flop for temporary stop is set in step 73 and then the special cycle is performed through step 74.

As described above, in the preferred embodiment, it is discriminated whether either the normal cycle or special cycle is to be performed depending upon the combination of large and small tools for required and spindle tools as well as upon the searched result of the status of other tool holding devices.

FIG. 5 shows a flow chart wherein a tool change operation is performed either at the normal or special cycle depending upon only the combination of large and small tools whereby when a control circuit is constructed by hardware, the circuit may be simplified to a considerable extent. In this flow chart, the steps 67, 70 and 71 indicated in FIG. 4 are omitted. Only the combination of large and small tools can unconditionally discriminate minate the normal or special cycle. In combinations of FIGS. 2A, 2B, 2D, and 2F, the same operation as in the previous case is performed. However, in the case of FIG. 2C, the flip flop for temporary stop is set to perform the special cycle. Since the tool holding device holding the required tool is searched in step 66, the machine operates in the same manner as in the normal cycle. In the case of FIG. 2E, it is impossible to perform discrimination and therefore the operation similar to the case of FIG. 2F is performed. However, even if such discrimination is impossible, there is no problem in the actual automatic tool change operation.

As described above, in the automatic tool change device according to the present invention, each tool is provided with a tool number to discriminate a large or small tool which is stored in the memory device. According to this tool number, a combination of large and small tools for required and spindle tools is discriminated. If the spindle tool can be immediately returned, a normal cycle of tool change operation is performed. If the spindle tool cannot be immediately returned, a special cycle of tool change operation is performed. Accordingly, even if large and small tools are mexedly used, the used tool can be returned in a random manner, whereby a tool change time can be remarkably shortened.

Furthermore, if a combination of large and small tools for spindle and required tools as well as a status of the entire tool holding devices is searched to determine whether the special cycle is to be performed, the case as shown in FIG. 2E can be performed in the normal cycle, which results in a further shortening of a tool change time.

Obviously, numerous modifications and variations of the present invention are possible in light of the above teachings. It is to be understood therefore that within the scope of the teachings herein, and the appended claims, the invention may be practiced otherwise than as specifically described herein.

What is claimed is:

1. In an automatic tool change apparatus for a machine tool including a rotatable magazine, a plurality of tool holding devices provided on said magazine and storing a variety of tools and addressed in a numerical order, a tool transfer device for performing a tool change operation between a tool indexed at a predetermined tool change position on said magazine and a tool held in a spindle of said machine tool, means for rotating said rotatable magazine, means for generating an index signal each time each tool holding device is indexed to the tool change position, means for commanding a tool to be indexed to the tool change position, first memory means for storing a number of a tool held in the spindle, second memory means for storing a relationship between numbers of the tool holding devices and numbers of the tools held in the respective tool holding devices, third memory means responsive to said command means for storing a number of the commanded tool, fourth memory means responsive to said index signal generating means for storing a number of a tool holding device indexed at the tool change position, means responsive to said command means for searching for a number of a tool holding device holding the commanded tool from said second memory means, fifth memory means responsive to said searching means for storing the searched number of the tool holding device, means for determining a rotational direction of said magazine in accordance with a difference in the contents stored in said fourth and fifth memory means to thereby cause said rotating means to rotate said magazine and for checking coincidence of the contents in said fourth and fifth memory means, means for loading the content of said third memory means into said first memory means and for loading the content of said first memory means into said second memory means after the tool change operation has been completed by said tool transfer device, the improvement of which comprises:

the numbers of the tools being identifiable whether the tools are large or small ones;

first discrimination means for discriminating whether the tool held in said spindle and the commanded tool are large or small ones in accordance with the contents stored in said first and third memory means;

second discrimination means responsive to said first discrimination means for discriminating a combination of the tool held in said spindle and the commanded tool so as to determine whether the tool held in the spindle can be immediately returned to the tool holding device holding the commanded tool; and cycle control means responsive to said second discriminating means for causing a normal cycle of a tool change operation to be performed if the spindle tool has been found to be immediately returnable, and for causing a special cycle of a tool change operation to be performed if the spindle tool has been found not to be immediately returnable.

2. An automatic tool change apparatus as claimed in claim 1, wherein said second discrimination means determines that the tool held in said spindle can be immediately returned when both of the spindle tool and the commanded tool are discriminated to be small or large ones.

3. An automatic tool change apparatus as claimed in claim 2, further comprising means for searching whether there are three consecutive empty tool holding devices on said magazine in accordance with the content of said second memory means, when the commanded tool is discriminated to be large and the spindle tool is discriminated to be small; and wherein said cycle control circuit causes the normal cycle to be performed when the searched result shows that there are three consecutive empty tool holding devices and causes the special cycle to be performed when the searched result shows that there are no three consecutive empty tool holding devices.

4. An automatic tool change apparatus as claimed in claim 2, wherein said cycle control means causes the normal cycle to be performed when the commanded tool is discriminated to be small and the spindle tool is discriminated to be large and when it is found that there are two empty tool holding devices sandwiching the tool holding device holding the commanded tool.

5. An automatic tool change apparatus as claimed in claim 2, wherein said second discrimination means determines that the spindle tool held in said spindle cannot be immediately returned when only one of the spindle tool and the commanded tool is found to be large.

* * * * *